(12) United States Patent
Lim

(10) Patent No.: US 9,885,336 B2
(45) Date of Patent: Feb. 6, 2018

(54) WAVE POWER GENERATION SYSTEM

(71) Applicant: Chae Gyoung Lim, Goyang-si (KR)

(72) Inventor: Chae Gyoung Lim, Goyang-si (KR)

( * ) Notice: Subject to any disclaimer, the term of this patent is extended or adjusted under 35 U.S.C. 154(b) by 0 days.

(21) Appl. No.: 15/298,378

(22) Filed: Oct. 20, 2016

(65) Prior Publication Data
US 2017/0114771 A1  Apr. 27, 2017

(30) Foreign Application Priority Data
Oct. 27, 2015 (KR) .......................... 10-2015-0149144

(51) Int. Cl.
| | |
|---|---|
| *F03B 13/10* | (2006.01) |
| *F03B 13/12* | (2006.01) |
| *H02P 9/04* | (2006.01) |
| *F03B 13/20* | (2006.01) |
| *H02K 7/108* | (2006.01) |
| *H02K 7/18* | (2006.01) |
| *F03B 13/18* | (2006.01) |

(52) U.S. Cl.
CPC ............ *F03B 13/20* (2013.01); *H02K 7/108* (2013.01); *H02K 7/1853* (2013.01); *Y02E 10/28* (2013.01); *Y02E 10/38* (2013.01)

(58) Field of Classification Search
USPC .............. 290/42, 53; 60/498, 504, 505, 506
See application file for complete search history.

(56) References Cited

U.S. PATENT DOCUMENTS

| | | | | |
|---|---|---|---|---|
| 867,459 | A * | 10/1907 | Willard ................. | F03B 17/061 290/43 |
| 1,647,025 | A * | 10/1927 | Stich .................... | F03B 13/1815 417/333 |
| 1,784,424 | A * | 12/1930 | Garwood .............. | F03B 13/186 185/30 |
| 1,816,044 | A * | 7/1931 | Gallagher ............. | F03B 13/186 60/506 |

(Continued)

FOREIGN PATENT DOCUMENTS

| | | |
|---|---|---|
| JP | 2006-226274 A | 8/2006 |
| KR | 1999-0040224 U | 11/1999 |
| KR | 10-1372542 B1 | 3/2014 |

*Primary Examiner* — Pedro J Cuevas
(74) *Attorney, Agent, or Firm* — KORUS Patent, LLC; Seong Il Jeong

(57) ABSTRACT

There is provided a wave power generation system comprising: first and second floating members to generate a floating force, wherein the first and second floating members are spaced from each other; first and second frames respectively coupled to the first and floating members; a pendulum swayably coupled to the first and second frames, wherein the pendulum is disposed between the first and second frames; a physical power converter operatively coupled to the first and second frames and operatively coupled to the first connection bars, wherein the physical power converter is configured to convert a pendulum movement force of the pendulum to a rotation force; a first wire operatively coupled to the physical power converter; a gearbox disposed on a land and operatively coupled to the wire, wherein the gearbox is configured to receive the rotation force from the (Continued)

first wire and to generate a continuous rotation force using first and second weights and one-way clutch.

20 Claims, 17 Drawing Sheets

(56) References Cited

U.S. PATENT DOCUMENTS

| | | | | |
|---|---|---|---|---|
| 2,179,537 A * | 11/1939 | Zoppa | ............ | F03B 13/185 204/230.5 |
| 2,749,085 A * | 6/1956 | Searcy | ............ | F03B 13/186 60/505 |
| 2,783,022 A * | 2/1957 | Salzer | ............ | F03B 13/186 405/76 |
| 3,922,013 A * | 11/1975 | Tidwell | ............ | F03B 13/1885 290/53 |
| 3,959,663 A * | 5/1976 | Rusby | ............ | F03B 13/262 290/53 |
| 5,882,143 A * | 3/1999 | Williams, Jr. | ............ | E02B 9/00 290/53 |
| 7,791,213 B2 * | 9/2010 | Patterson | ............ | F03B 13/1865 290/53 |
| 9,181,922 B2 * | 11/2015 | Dib Echeverria | ............ | F03B 13/186 |
| 9,764,804 B1 * | 9/2017 | Kennamer, Sr. | ............ | B63B 35/44 |
| 2003/0129893 A1 * | 7/2003 | Gorshkov | ............ | B63H 19/02 440/99 |
| 2009/0196693 A1 * | 8/2009 | Kelly | ............ | F03B 13/18 405/195.1 |
| 2010/0043425 A1 * | 2/2010 | Dragic | ............ | F03B 13/1855 60/504 |
| 2013/0104537 A1 * | 5/2013 | Dib Echeverria | ............ | F03B 13/186 60/498 |

* cited by examiner

WAVE POWER GENERATION SYSTEM

CROSS-REFERENCE TO RELATED APPLICATION

This application claims the benefit of Korea patent application No. 10-2015-0149144, filed on Oct. 27, 2015, the entire content of which is incorporated herein by reference for all purposes as if fully set forth herein.

BACKGROUND

Field of the Present Disclosure

The present disclosure relates to a wave power generation system, and, more particularly, to a wave power generation system capable of generating a continuous physical rotation force in a single direction regardless of rising and ebb tides, and of using higher level wave energy at a location more distant from a land using a wire.

Discussion of Related Art

Regarding a prior-art wave power generation system, Korean patent No. 10-0989594 discloses a wave force generation system using a floating structure is provided to generate electric power using height difference of waves naturally generated by winds at sea. In this document, the wave force generation system using floating structure includes a thread connecting unit having an end connected to a lower side of the floating structure and the other end formed with threads, a rotation device connected to the threads of the thread connecting unit to rotate while moving forward and backward in the thread direction, a generator installed in the rotation device to generate electric energy during the rotation of the rotation device, a connection unit having an end connected to the other end of the rotation device and the other fixed to a sea-bottom surface by a fixing unit and a floating structure installed at sea level to reciprocate up and down due to height difference of waves. The floating structure is provided with the thread connecting unit, the rotation device, and the connection unit.

Further, Korean patent No. 10-1155290 discloses a turbine generator and wave power generation system using the same are provided to directly convert the linear reciprocation energy of fluid into rotational energy by coupling a turbine to the rotor of a generator. In this document, a turbine generator comprises a casing, a fixed shaft, rotors, and stators. Both ends of the fixed shaft are fixed to the inner sides of the casing. The rotors are installed bearings formed in both sides of the fixed shaft. Blades are installed on the outer surface of the rotors and directly convert the linear reciprocation energy of fluid into rotational energy. The stators are fixed to the fixed shaft inside the rotors.

Further, Korean patent No. 10-1230486 discloses a wave power generator is provided to directly deliver the vertical kinetic energy of a buoyant body to a motion converting device as the length of a motion transfer member is tightly controlled by a length regulator. In this document, a wave power generator comprises a buoyant body, a motion transfer member, a seabed fixed body, a motion converting device, a weighted body, and a generator. One end of the motion transfer member is connected to the buoyant body to transfer kinetic energy. The motion transfer member is vertically installed under the sea by the seabed fixed body. The motion converting device is connected to the other end of the motion transfer member which is connected to the seabed fixed body. The weighted body is installed on the end of the motion transfer member installed by the motion converting device. The generator is operated by the motion converting device.

Furthermore, U.S. Pat. No. 7,791,213 disclose a vertical motion wave power generator having a flotation device, a vertical support structure fixed to the ocean bottom, and a single power shaft attached rotatably to the flotation device. By the use of a pair of one-way clutches the single power shaft converts the up and down motion of ocean waves into continuous unidirectional rotational force to drive an electric generator. The powershaft, transmission, and generator are all attached to the flotation device and move up and down in unison with the flotation device Furthermore, U.S. Pat. No. 7,632,041 B2 discloses systems for obtaining electrical energy from sea waves using deflectable material, especially EAP (electro-active polymers) type SSM (stretchable synthetic material) that generates electricity when an electrostatic charge is applied to the polymer and it is stretched. In one system, a buoyant element has upper and lower parts connected by a quantity of SSM, with the lower part anchored at a fixed height above the sea floor and with the upper part movable vertically to stretch and relax the SSM as waves pass over. In another system the buoy is rigid, but is anchored to the sea floor by at least one line that includes, or is connected to at least a length of SSM material. In still another system a plurality of rigid buoys that float on the sea surface, are connected in tandem by SMM that is stretched and relaxed as the buoys pivot relative to each other in following the waves.

All of the above-described wave power generation systems may not generate continuous physical rotation force in a single direction due to rising and ebb tides. Thus, there is a need for a wave power generation system capable of generating a continuous physical rotation force in a single direction regardless of rising and ebb tides.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is to provide a wave power generation system capable of generating a continuous physical rotation force in a single direction regardless of rising and ebb tides, and of using higher level wave energy at a location more distant from a land using a wire which transmits the pendulum movement force to a gearbox on a land.

Furthermore, the present disclosure is to provide a wave power generation system capable of being adapted for changes of an input direction of the wave force.

Furthermore, the present disclosure is to provide a wave power generation system capable of withstanding the heavy weather state.

Furthermore, the present disclosure is to provide a wave power generation system having a higher wave energy absorption rate than the conventional wave power generation system using a vertical movement of a wave.

Furthermore, the present disclosure is to provide a wave power generation system capable of being less subjected to movements such as surge, sway, heave, rolling, pitch, and yaw.

Furthermore, the present disclosure is to provide a wave power generation system having a pendulum to concentrate multi-directional wave forces on the central region of the pendulum, to deal with an excessive wave pressure, and to reduce the influence of the wave force.

Furthermore, the present disclosure is to provide a wave power generation system having universal joints having an articulated movement to be adapted to the direction of the wave force transmitted from the pendulum, and, thus, to act to flexibly absorb the wave force when the direction of the wave force varies frequently.

Furthermore, the present disclosure is to provide a wave power generation system having a lower installation cost than in a wave power generation system using a sea-bottom mounted electrical transmission line.

In one aspect of the present disclosure, there is provided a wave power generation system comprising: first and second floating members to generate a floating force, wherein the first and second floating members are spaced from each other; first and second frames respectively coupled to the first and floating members; a pendulum swayably coupled to the first and second frames, wherein the pendulum is disposed between the first and second frames; holding means coupled to the first and second frames to hold the frames so as to allow movement of the floating members; first connection bars coupled to a top of the pendulum; a physical power converter operatively coupled to the first and second frames and operatively coupled to the first connection bars, wherein the physical power converter is configured to convert a pendulum movement force of the pendulum to a rotation force; a first wire operatively coupled to the physical power converter; a gearbox disposed on a land and operatively coupled to the wire, wherein the gearbox is configured to receive the rotation force from the first wire and to generate a continuous rotation force using first and second weights and one-way clutch; and power transmission means configured to transmit an output from the gearbox to an electric power generator.

In one implementation, each frame includes a plurality of transverse pipes, a plurality of longitudinal pipes, and a plurality of vertical pipes, which are collectively coupled to one another.

In one implementation, the physical power converter includes: second connection bars spaced from each other, the second connection bars being vertically coupled to the first connection bars respectively; a connection bridge to connect tops of the second connection bars to each other; third connection bars horizontally coupled to, at one end thereof, the second connection bars respectively, wherein the third connection bars are coupled, at the other end thereof, to the first and second frames respectively; and universal joints provided at a middle portion of the third connection bars respectively, wherein the first wire is coupled to the connection bridge to transmit the physical force from the pendulum to the gearbox.

In one implementation, the system further comprises a returning weight coupled to the connection bridge via a second wire to apply a returning force to the connection bridge.

In one implementation, the physical power converter further includes rotatable connectors, each rotatable connector connecting each second connection bar and each first connection bar to each other, wherein each rotatable connector allows each first connection bar to rotate with respect to each second connection bar.

In one implementation, the rotatable connector includes: a first flange coupled to each second connection bar; a second flange coupled to each first connection bar; a plurality of slots defined in the first flange, the slots being arranged in an outer periphery of the first flange and spaced from each other, each slot extending in an arc shape; and vertical connectors corresponding to the slots respectively, each vertical connector extending from the second flange upwards and through each slot and beyond each slot, wherein each vertical connector is movably fastened to the first flange using a nut.

In one implementation, wherein the rotatable connector includes: a first flange coupled to each second connection bar; a second flange coupled to each first connection bar; a torsion spring disposed between the first and second flanges and coupled thereto, wherein the torsion spring allows the rotated first connection bar to return to its original position.

In one implementation, the gearbox includes: a first pulley wound by the first wire; a first rotation shaft rotated via movement of the first wire and axially coupled to a first power gear; second and third pulleys axially coupled to the first rotation shaft at both ends thereof respectively; first and second weights suspended by second wires respectively winding the second and third pulleys respectively, wherein a forward rotation of the first rotation shaft allows the first and second weights to ascend, and a reverse rotation of the first rotation shaft allows the first and second weights to descend, thereby to provide the first rotation shaft with a rotation force; a second rotation shaft axially coupled to a second power gear meshed with the first power gear axially coupled to the first rotation shaft, wherein the second power gear rotates together with the first power gear; a first drive shaft coupled via a power conveyor to the second rotation shaft to rotate together with the second rotation shaft; a second drive shaft to receive a rotation force from the first drive shaft to rotate together with the first drive shaft; a chain gear as the power conveyor to transmit the rotation force from the first drive shaft to the second drive shaft; first and second power transmitters disposed between the first and second drive shafts, wherein each of the first and second power transmitters includes a plurality of gears meshed with each other to transmit a physical power from the first drive shaft to the second drive shaft; a forward one-way clutch embedded in a gear of the first power transmitter axially coupled to the second drive shaft to deliver a forward rotation force to the second drive shaft; and first and second reverse one-way clutches axially coupled to the second drive shaft for delivery of a reverse rotation force.

In one implementation, the first power transmitter includes first, second, third, and fourth power transmission gears configured to transmit a forward rotation force of the first drive shaft to the second drive shaft as a forward rotation force applied thereto; and wherein the second power transmitter includes first, second, and third rotation gears configured to transmit a reverse rotation force of the first drive shaft to the second drive shaft as a forward rotation force applied thereto.

In one implementation, the gearbox further includes stopper means configured to stop a rotation of the first rotation shaft.

In one implementation, the stopper means includes a wheel pulley axially coupled to the first rotation shaft at each of both ends thereof, wherein the wheel pulley has a plurality of holes defined therein; and a stopper bar axially movably coupled to each vertical support to be inserted into a selected hole of the wheel pulley.

In one implementation, the holding means includes: a first holding wire coupled, at one end thereof, to a ring fixed to one of the first and second frames; a holding weight coupled to the other end of the first holding wire; a holding support disposed on a land to support the first holding wire; a second holding wire coupled, at one end thereof, to an anchoring pulley fixed to the other of the first and second frames and coupled, at the other end thereof, to an anchoring structure.

In one implementation, the holding means further includes a strap buckle provided at a middle portion of the second holding wire.

In one implementation, the holding means includes: an anchor pile to be partially inserted into a sea floor, wherein the anchor pile is hollow in a longitudinal direction thereof, and has a receiving slot partially formed in a longitudinal direction thereof; an elongate guide piece inserted into the receiving slot of the anchor pile, wherein the guide piece has a guide slot formed in a longitudinal direction thereof and open at a top thereof; an elongate fixing plate fixed to each of the floating members; and a plurality of guide protrusions horizontally extending from the fixing plate and vertically spacedly arranged with one another, wherein a plurality of guide protrusions is slidably inserted into the guide slot, wherein the plurality of guide protrusions is slidably vertically moved down such that the fixing plate is inserted into the inner hollow space of the anchor pile.

In one implementation, the pendulum has a groove defined in a front face in a middle region thereof.

In one implementation, the pendulum include a lower pendulum, and an upper pendulum coupled via a rotatable connector to the lower pendulum.

In one implementation, the third connection bars are rotatably coupled to the first and second frame via brackets respectively coupled to both frames.

In one implementation, the holding means further includes an anchoring wheel coupled to the anchoring pulley and having a plurality of holes defined therein; and an anchoring stopper to be inserted into the selected hole of the anchoring wheel to stop the anchoring structure.

In one implementation, the holding support includes: a holding pulley disposed on a land to support the first holding wire; a holding support shaft to support the holding pulley; a holding wheel coupled to the holding support shaft, wherein the holding wheel has a plurality of holes; and a holding stopper to be inserted into a selected hole of the holding wheel to stop a rotation of the holding support shaft.

In one implementation, the pendulum has a sea-water through-hole to deal with an excessive wave pressure.

In accordance with the present disclosure, the wave power generation system may be capable of generating a continuous physical rotation force in a single direction regardless of rising and ebb tides. This may be achieved using the gearbox using one-way clutches and the descending and ascending weights.

Further, in accordance with the present disclosure, the wave power generation system may employ the higher level wave energy at a location more distant from a land using a wire which transmits the pendulum movement force to a gearbox on a land.

Furthermore, in accordance with the present disclosure, the wave power generation system may be capable of being adapted for changes of an input direction of the wave force.

Furthermore, in accordance with the present disclosure, the wave power generation system may be capable of withstanding the heavy weather state.

Furthermore, in accordance with the present disclosure, the wave power generation system may have a higher wave energy absorption rate using the pendulum than the conventional wave power generation system using a vertical movement of a wave.

Furthermore, in accordance with the present disclosure, the wave power generation system may be less subjected to movements such as surge, sway, heave, rolling, pitch, and yaw.

Furthermore, in accordance with the present disclosure, the wave power generation system may concentrate multi-directional wave forces on the central region of the pendulum, to deal with an excessive wave pressure, and to reduce the influence of the wave force.

Furthermore, in accordance with the present disclosure, the wave power generation system may be adapted for the direction of the wave force transmitted from the pendulum, and, thus, may act to flexibly absorb the wave force when the direction of the wave force varies frequently.

Furthermore, in accordance with the present disclosure, the wave power generation system may have a lower installation cost than in a wave power generation system using a sea-bottom mounted electrical transmission line.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

Figure 1:
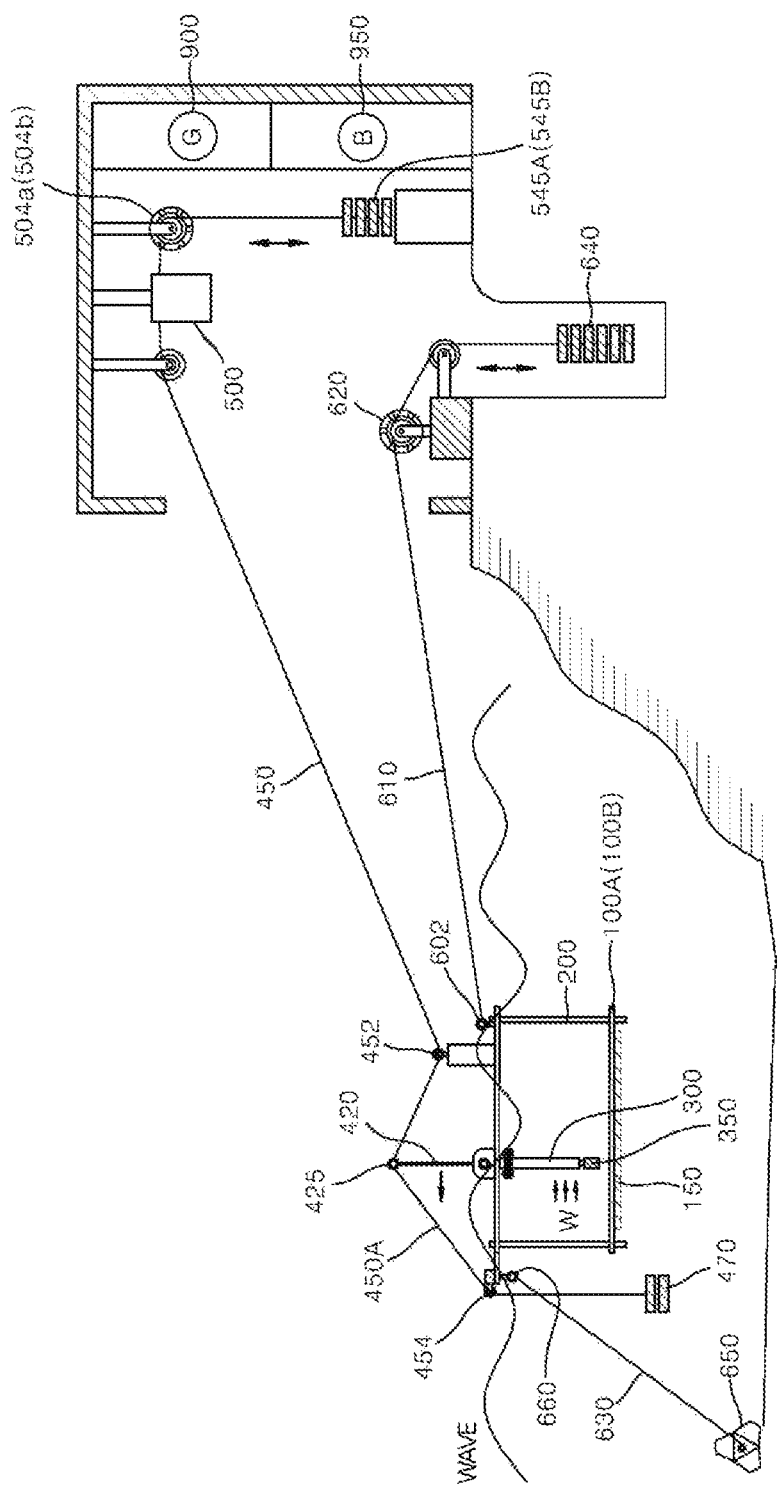
FIG. 1 is a high level diagram of a wave power generation system in accordance with one embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTIONS

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

A wave power generation system in accordance with one embodiment of the present disclosure may use higher level wave energy at a location more distant from a land using a wire which transmits a pendulum movement force to a gearbox on a land.

A wave power generation system in accordance with one embodiment of the present disclosure may include floating members 100A and 100B to generate a floating force, a frame 200 coupled to the floating members 100A and 100B to be floated on or in sea-water, a pendulum 300 swayably coupled to the frame 200, wherein the pendulum 300 is configured to sway using a wave power, holding means coupled to the frame 200 to hold the frame 200 such that the floating members 100A and 100B moves; first connection bars 410 coupled to a top of the pendulum 300; a physical power converter secured to the frame 200 and operatively coupled to the first connection bars 410, wherein the physical power converter is configured to convert a pendulum movement force of the pendulum 300 to a rotation force; a first wire 450 operatively coupled to the physical power converter; a gearbox 500 disposed on a land and operatively coupled to the wire 450, wherein the gearbox 500 is configured to receive the rotation force from the first wire 450 and to generate a continuous rotation force using first and second weights 545A,545B and one-way clutches; and power transmission means configured to transmit an output from the gearbox 500 to an electric power generator 900.

Specifically, the two floating members 100A and 100B may be spaced from each other. Each of floating members 100A and 100B may have coupling holes 125 defined in each inner side face thereof. Connector rods 145 may be inserted into the coupling holes 125 respectively of the floating members 100A and 100B to connect the floating members 100A and 100B to each other.

Figure 4:
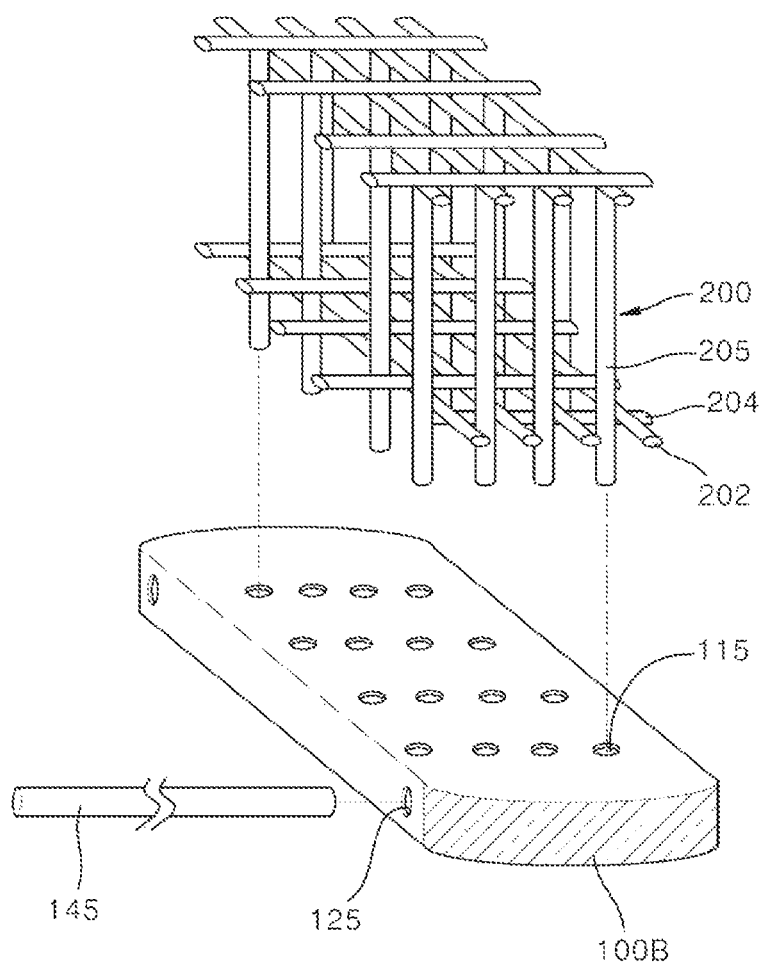
FIG. 4 illustrates a state before frames are coupled to floating members, in accordance with one embodiment of the present disclosure.

Further, as shown in FIG. 4, each of the floating members 100A and 100B may have plurality of coupling holes 115 defined on a top thereof to receive therein pipes of the frame 200.

The frame 200 may include a plurality of transverse pipes 202, a plurality of longitudinal pipes 204, and a plurality of vertical pipes 205, which are collectively coupled to one another to form a cage. The vertical pipes may be inserted into the coupling holes 115 to allow the connection between the floating members 100A and 100B and the frame 200.

Furthermore, the transverse pipes 202 may be horizontally perpendicular to the longitudinal pipes 204. The vertical pipes 205 may be vertically perpendicular to the transverse pipes 202 and longitudinal pipes 204. Thus, the contact area between the frame 200 and sea-water may be minimized to minimize an influence of the wave power.

The case-structured frame 200 may be partially submerged in seawater using weights 150 coupled to the floating members 100A and 100B at bottoms thereof. The sea-water may flow through the case-structured frame 200. Thus, the case-structured frame 200 may be less subjected to the wave load.

The pendulum 300 may sway using the wave force. The pendulum 300 may be coupled to the first connection bars 410 which may be operatively coupled to the physical power converter.

Further, the pendulum 300 may have a groove 305 defined in a front face in a middle region thereof. The pendulum 300 may have a balancer weight 350 coupled thereto at the bottom thereof.

The groove 305 may act to concentrate multi-directional wave forces on the central region of the pendulum.

The pendulum 300 may have a sea-water through-hole 315 to deal with an excessive wave pressure.

The pendulum 300 may be rounded at a rear portion thereof to reduce the influence of the wave force.

Figure 2:
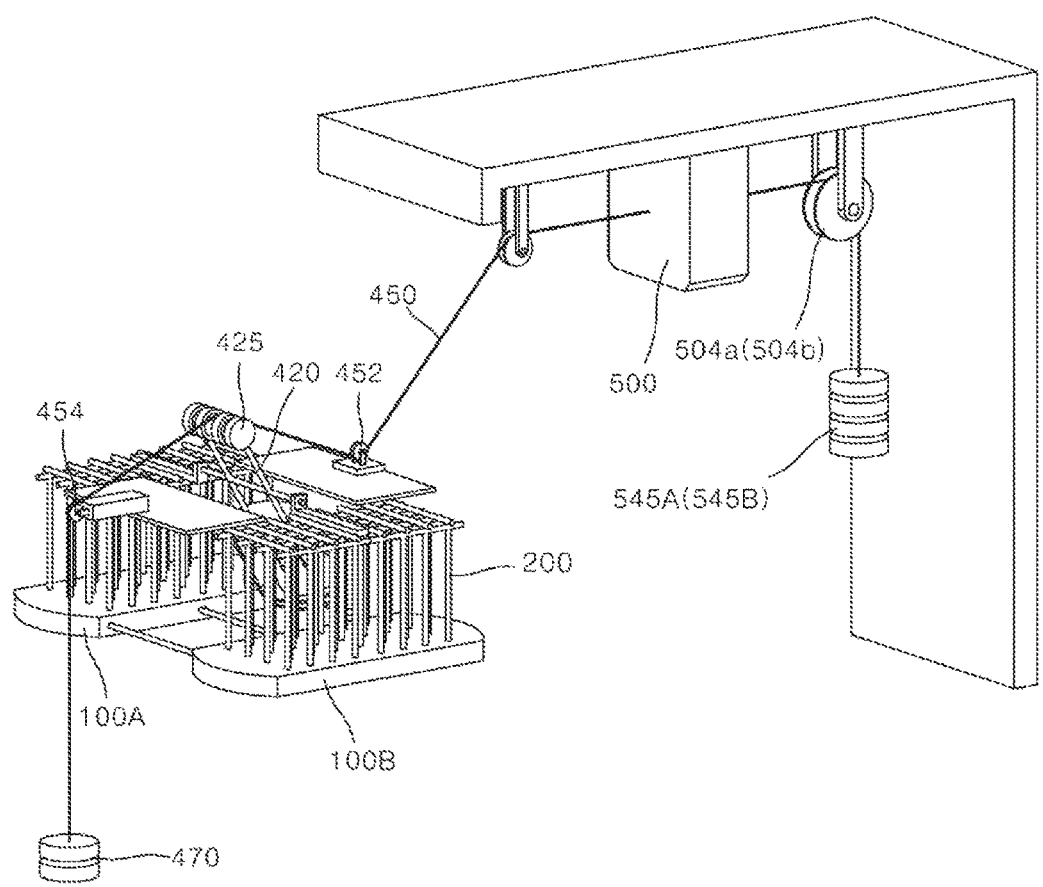
FIG. 2 is a perspective view of a wave power generation system in accordance with one embodiment of the present disclosure.
Figure 3:
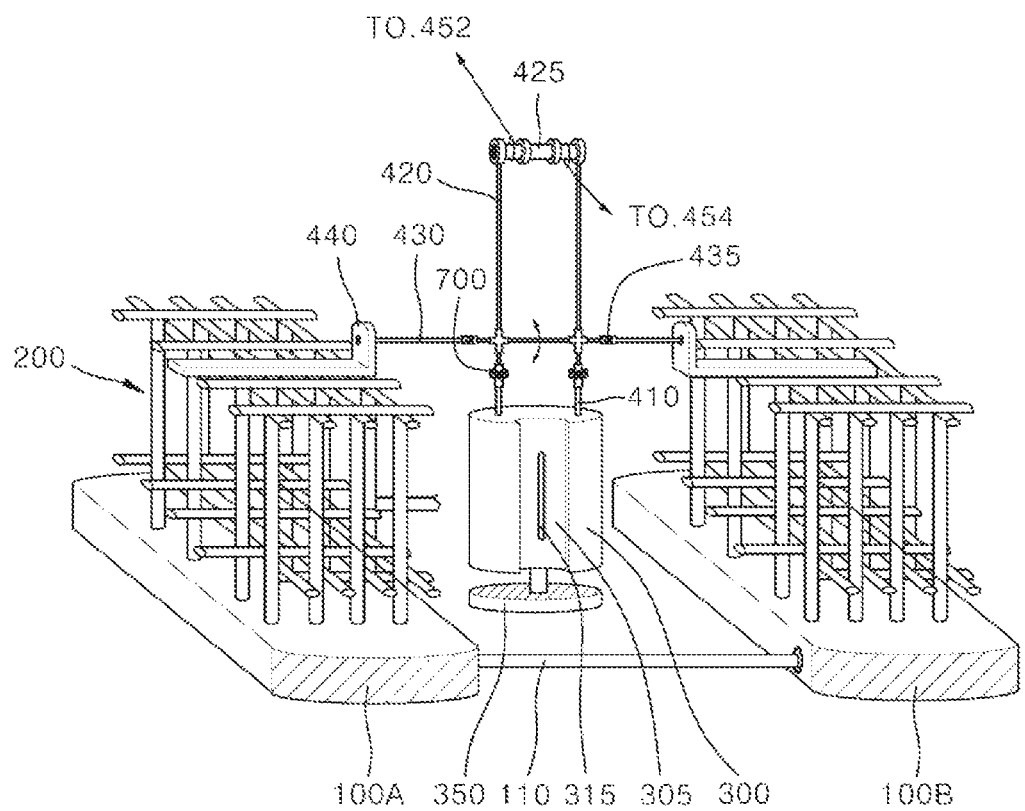
FIG. 3 is perspective view of a configuration of a pendulum and physical power converter of a wave power generation system in accordance with one embodiment of the present disclosure.

The physical power converter is shown as FIG. 1 to FIG. 3. The physical power converter may be configured to convert the pendulum movement force to the rotation force. To this end, the physical power converter may include second connection bars 420 spaced from each other, the second connection bars 420 being vertically coupled to the first connection bars 410 respectively; a connection bridge 425 to connect tops of the second connection bars 420 to each other; third connection bars 430 horizontally coupled, at one end thereof, to the second connection bars 420 respectively, wherein the third connection bars 430 are coupled, at the other end thereof, to the frame 200; universal joints 435 provided at a middle portion of the third connection bars 430 respectively; the first wire 450 coupled to the connection bridge 425 to transmit the physical force from the pendulum 300 to the gearbox; and a returning weight 470 coupled to the connection bridge 425 via a second wire 450A to apply a returning force to the connection bridge.

The second connection bars 420 may be coupled to the third connection bars 430 via cross-shaped connection bars respectively.

The third connection bars 430 may have the universal joints 435 respectively at middle portions thereof respectively. Each of the universal joints 435 may have an articulated movement to be adapted to the direction of the wave force transmitted from the pendulum 300 and first connection bars 410. In this way, the universal joints 435 may act to flexibly absorb the wave force when the direction of the wave force varies frequently.

Figure 7:
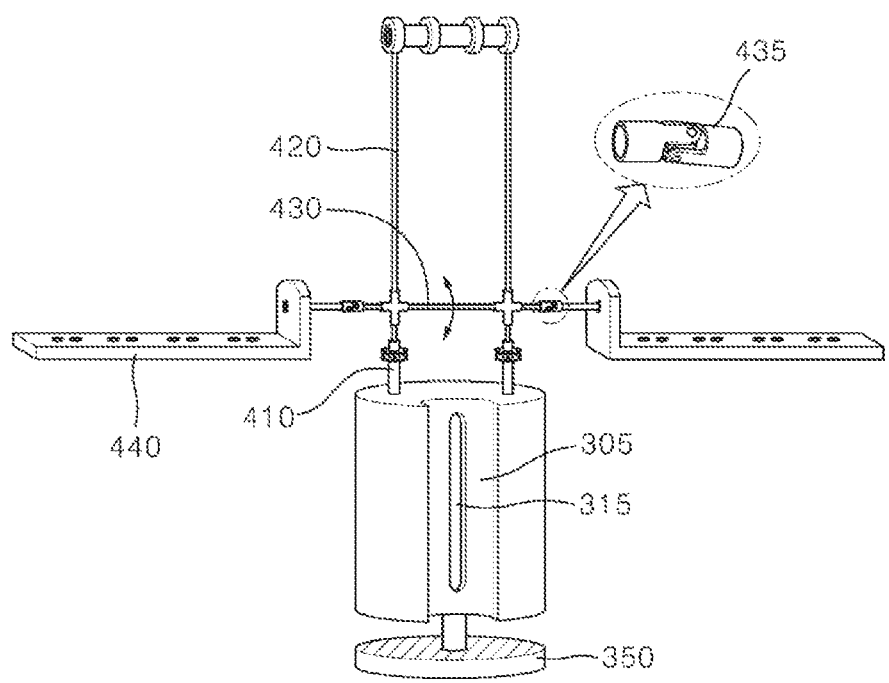
FIG. 7 illustrates a connection between the physical power converter and pendulum in accordance with one embodiment of the present disclosure.

Further, as shown in FIG. 7, the third connection bars 430 may be rotatably coupled to the frame 200 via brackets 440 respectively coupled to left and right sub-frames 200.

The first wire 450 may be coupled, at one end thereof, to a first pulley 503, and coupled, at the other end thereof, to the connection bridge 425. Thus, the first wire 450 may deliver the pendulum movement force of the pendulum 300 to the gearbox. The first pulley 503 may belong to the gearbox.

Further, in order to maintain the tension of the first wire 450, the first wire 450 may be pressured down by a first support pulley 452 disposed above one of the left and right frames 200.

The first support pulley 452 may employ dual pulleys, which may press down the first wire 450 to maintain the tension of the first wire 450.

The second wire 450A may be coupled, at one end thereof, to the returning weight 470, and coupled, at the other end thereof, to the connection bridge 425.

Further, the second wire 450A may be supported by a second support pulley 454 disposed adjacent to the other of the left and right frames 200.

The holding means may include a first holding wire 610 coupled, at one end thereof, to a ring 602 fixed to one of the left and right frames 200; a holding weight 640 coupled to the other end of the first holding wire 610; a holding support 620 disposed on a land to support the first holding wire 610; and a second holding wire 630 coupled, at one end thereof, to an anchoring pulley 660 fixed to the other of the left and right frames 200 and coupled, at the other end thereof, to an anchoring structure 650.

Figure 9:
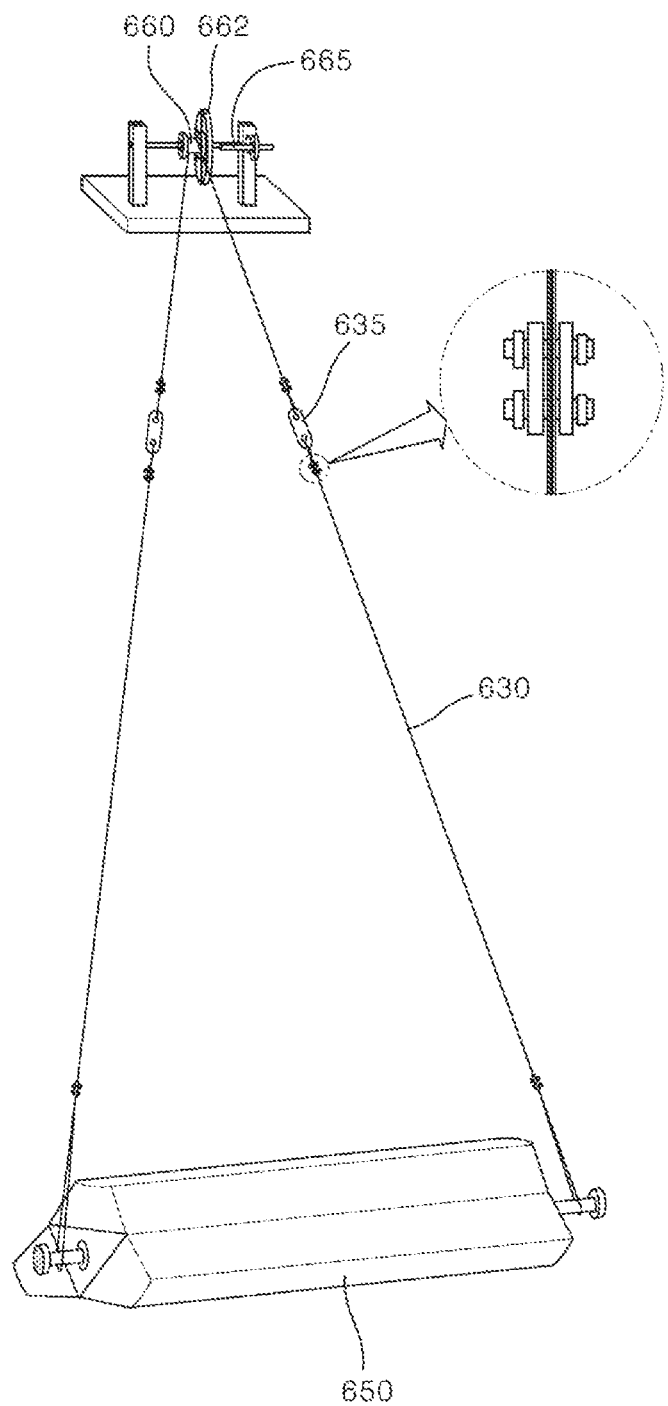
FIG. 9 illustrates a configuration of an anchoring structure and anchoring pulley in accordance with one embodiment of the present disclosure.

As shown in FIG. 9, the holding means may further include a strap buckle 635 provided at the middle portion of the second holding wire 630. The strap buckle 635 may be removed from the second holding wire 630. The removal of the strap buckle 635 from the second holding wire 630 may disable the holding function, thereby to move the present wave power generation system to the land in an emergency state, such as a typhoon.

The holding means may further include an anchoring wheel 662 coupled to the anchoring pulley 660 and having a plurality of holes defined therein; and an anchoring stopper 665 to be inserted into the selected hole of the anchoring wheel 662 to stop the anchoring structure 650.

Figure 10:
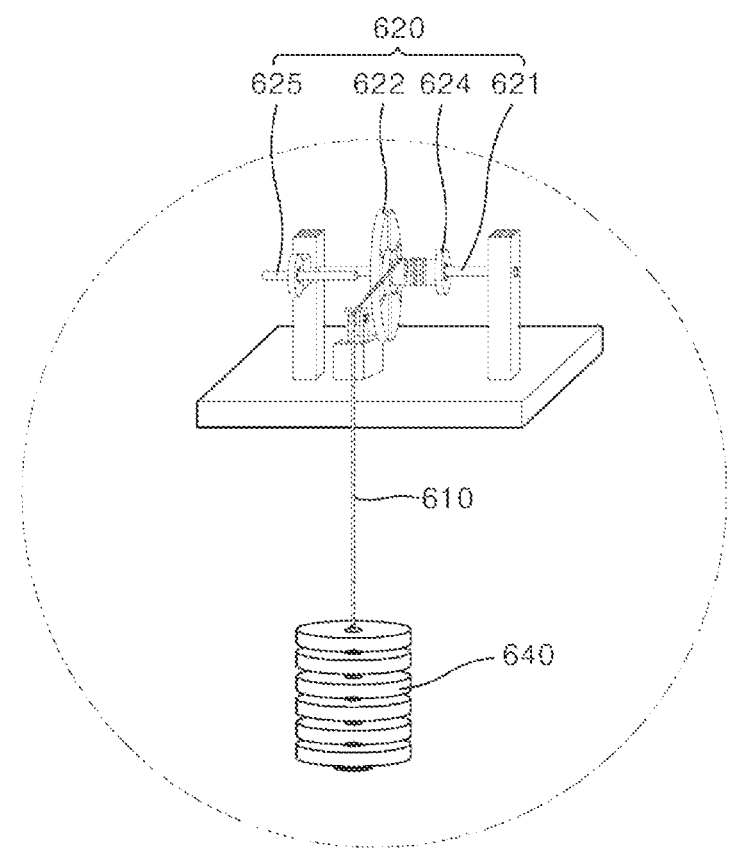
FIG. 10 illustrates a perspective view of a holding support in accordance with one embodiment of the present disclosure.

As shown in FIG. 10, the holding support 620 may include a holding pulley 624 disposed on a land to support the first holding wire 610; a holding support shaft 621 to support the holding pulley 624; a holding wheel 622 coupled to the holding support shaft 621, wherein the holding wheel has a plurality of holes; and a holding stopper 625 to be inserted into a selected hole of the holding wheel 622 to stop a rotation of the holding support shaft 621.

Typically, a far-away wave from a land may be used to improve an efficiency of a wave energy. This may be achieved by a power transmission system using the first wire 450.

A rotatable connector 700 may connect the second connection bars 420 and first connection bars 410 to each other. The rotatable connector 700 may be adapted for the change of the input direction of the wave force. The rotatable connector 700 may allow the first connection bars 410 to rotate with respect to the second connection bars 420.

Figure 5:
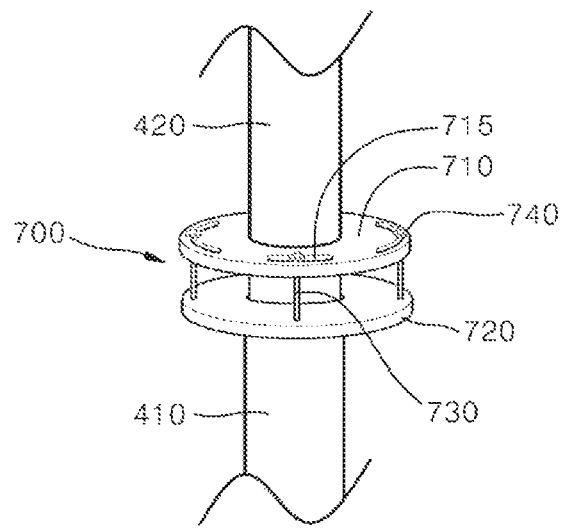
FIG. 5 illustrates a rotatable connector in accordance with one embodiment of the present disclosure.

As shown in FIG. 5, the rotatable connector 700 may include a first flange 710 coupled to each second connection bar 420; a second flange 720 coupled to each first connection bar 410; a plurality of slots 715 defined in the first flange 710, the slots being arranged in an outer periphery and spaced from each other, each slot extending in an arc shape; and vertical connectors 730 corresponding to the slots 715, each vertical connector extending from the second flange 720 upwards and through each slot 715 and beyond each slot, wherein each vertical connector is movably fastened to the first flange using a nut 740.

The vertical connectors 730 may horizontally rotate in and along the slots 715. This may allow the pendulum 300 to horizontally rotate depending on the input direction of the wave force.

Figure 6:
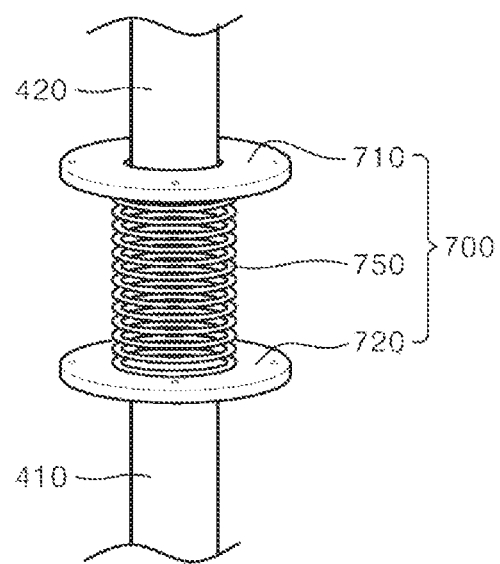
FIG. 6 illustrates a rotatable connector in accordance with another embodiment of the present disclosure.

In an alternative, as shown in FIG. 6, the rotatable connector 700 may include a first flange 710 coupled to each second connection bar 420; a second flange 720 coupled to each first connection bar 410; a torsion spring 750 disposed between the first and second flanges 710, 720 and coupled thereto, wherein the torsion spring 750 may allow the rotated first connection bar 410 to return to its original position. The torsion spring 750 may be implemented in a coil type.

Figure 8:
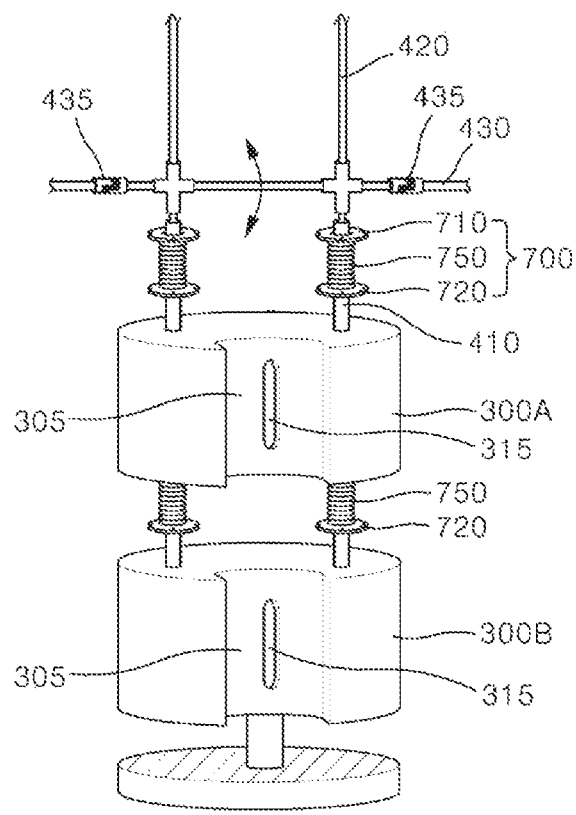
FIG. 8 illustrates one variation of a pendulum in accordance with another embodiment of the present disclosure.

As shown in FIG. 8, the pendulum 300 may include a lower pendulum 300B to be submerged in sea-water, and an upper pendulum 300A coupled via the rotatable connector 700 to the lower pendulum 300B. Thus, the combination of the upper pendulum 300A and lower pendulum 300B may be adapted for bidirectional wave forces. In this way, the pendulum 300 may include multiple sub-pendulums vertically coupled to one another via multiple rotatable connectors.

Figure 11A:
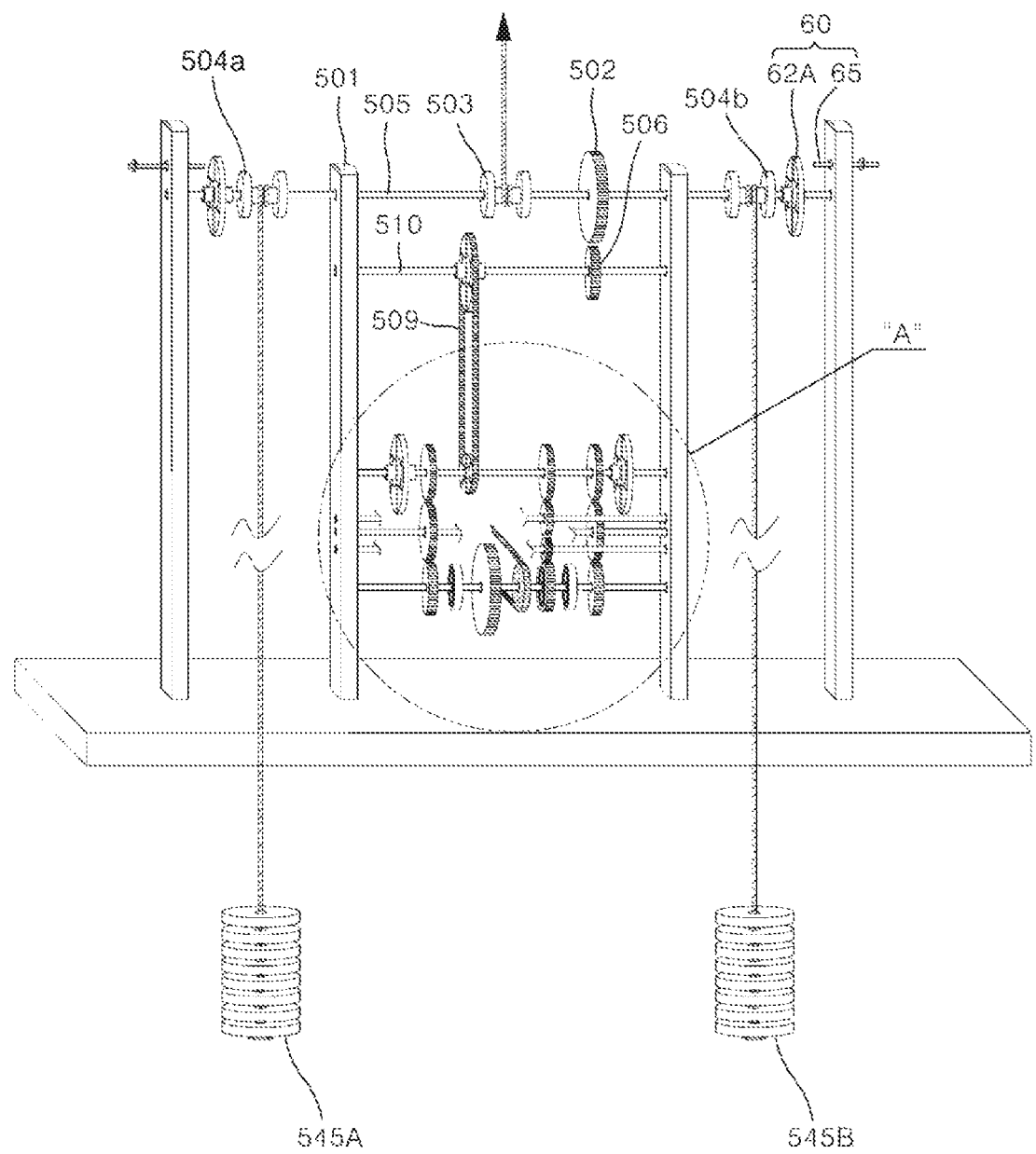
FIG. 11A illustrates a configuration of a gearbox in accordance with one embodiment of the present disclosure.
Figure 11B:
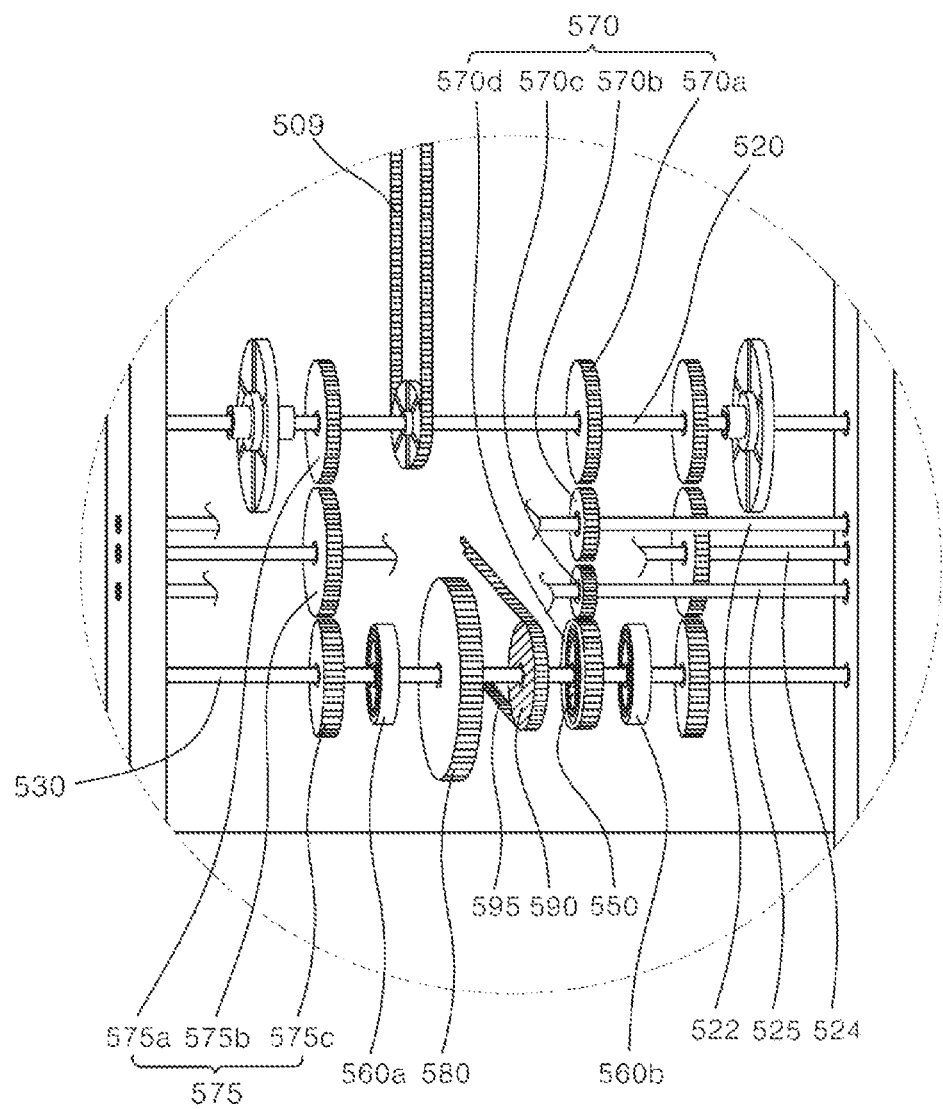
FIG. 11B illustrates an enlarged view of an "A" section in FIG. 11A.

As shown in FIG. 11A and FIG. 11B, the gearbox 500 may include the first pulley 503 wound by the first wire 450; a first rotation shaft 505 rotated via the movement of the first wire 450 and axially coupled to a first power gear 502; second, third pulleys 504a,504b axially coupled to the first rotation shaft 505 at both ends thereof respectively; first and second weights 545A,545B suspended by second wires 450A respectively winding the second and third pulleys 504a,504b respectively, wherein the forward rotation of the first rotation shaft 505 allows the first and second weights 545A,545B to ascend, and the reverse rotation of the first rotation shaft 505 allows the first and second weights 545A,545B to descend, thereby to provide the first rotation shaft 505 with a rotation force; a second rotation shaft 510 axially coupled to a second power gear 506 meshed with the first power gear 502 axially coupled to the first rotation shaft 505, wherein the second power gear 506 rotates together with the first power gear 502; a first drive shaft 520 coupled via a power conveyor 509 to the second rotation shaft 510 to rotate together with the second rotation shaft 510; a second drive shaft 530 to receive a rotation force from the first drive shaft 520 to rotate together with the first drive shaft 520; a chain gear 590 as the power conveyor 509 to transmit the rotation force from the first drive shaft 520 to the second drive shaft 530; first and second power transmitters 570,575 disposed between the first and second drive shafts 520,530, wherein each of the first and second power transmitters 570,575 includes a plurality of gears meshed with each other to transmit a physical power from the first drive shaft 520 to the second drive shaft 530; a forward one-way clutch 550 embedded in a gear 570d of the first power transmitter 570 axially coupled to the second drive shaft 530 to deliver a forward rotation force to the second drive shaft 530; and first and second reverse one-way clutches 560a,560b axially coupled to the second drive shaft 530 for delivery of a reverse rotation force.

The power transmitter may include a first power transmitter 570 including first, second, third, and fourth power transmission gears 570a, 570b, 570c, 570d configured to transmit a forward rotation force of the first drive shaft 520 to the second drive shaft 530 as a forward rotation force; and a second power transmitter 575 including first, second, third rotation gears 575a, 575b, 575c configured to transmit a reverse rotation force of the first drive shaft 520 to the second drive shaft 530 as a forward rotation force.

The forward one-way clutch 550 may be embedded in the fourth power transmission gear 570d. The forward one-way clutch 550 may be configured to allow the second drive shaft 530 to rotate only in a forward direction to rotate a chain gear 590 only in a forward direction. In other words, the forward one-way clutch 550 may be configured to disallow the second drive shaft 530 to rotate in a reverse direction.

The forward one-way clutch 550 may be configured to deliver the forward rotation force via a clutch-on, and not to deliver the reverse rotation force via a clutch-off. The first and second reverse one-way clutches 560a and 560b may be configured to operate in an opposite manner to the forward one-way clutch 550.

Figure 13:
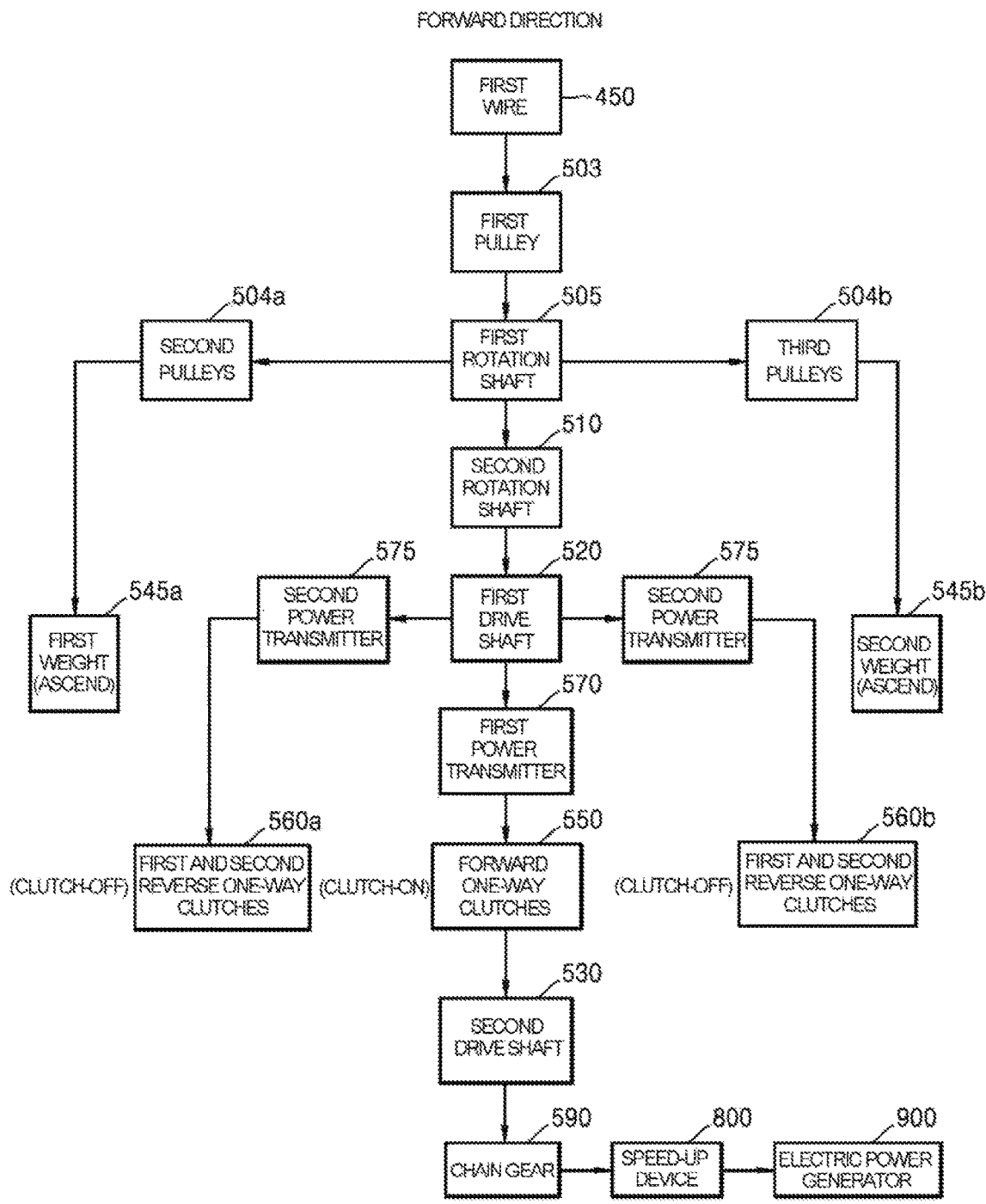
FIG. 13 is a flow chart of a power transmission for a forward operation of a gearbox in accordance with one embodiment of the present disclosure.

The first reverse one-way clutch 560a may be axially coupled to the second drive shaft 530 at a position between the central-positioned chain gear 590 and left-positioned second power transmitter 575. The second reverse one-way clutch 560b may be axially coupled to the second drive shaft 530 at a position between the first power transmitter 570 and a right-positioned second power transmitter 575. Thus, as shown in FIG. 13, the first and second reverse one-way clutches 560a and 560b may be configured to prevent the rotation force of the second power transmitter 575 from being transmitted to the chain gear 590 during the forward rotation of the gearbox 500. In this way, a first rotation force from the first power transmitter 570 and a second rotation force from the second power transmitter 575 may be prevented from being mixed at the chain gear 950, wherein the first rotation force is opposite to the second rotation force in a direction thereof.

Further, reference numerals "522, 524, 525" indicate first, second, and third support shafts respectively to axially support a second power transmission gear 570b, a second rotation gear 575b and a third power transmission gear 570c respectively.

Further, the gearbox may further include stopper means 60 configured to stop a rotation of the first rotation shaft 505. The stopper means 60 may include a wheel pulley 62A axially coupled to the first rotation shaft 505 at each of both ends thereof, wherein the wheel pulley 62A has a plurality of holes defined therein; and a stopper bar 65 axially movably coupled to each vertical support to be inserted into a selected hole of the wheel pulley 62A.

The stopper means 60 may be used to stop the rotation of the first rotation shaft 505 for maintenance or evacuation of the present system. For this, the stopper bar 65 may axially move into the hole in the wheel pulley 62A to stop the rotation of the first rotation shaft 505.

Figure 12:
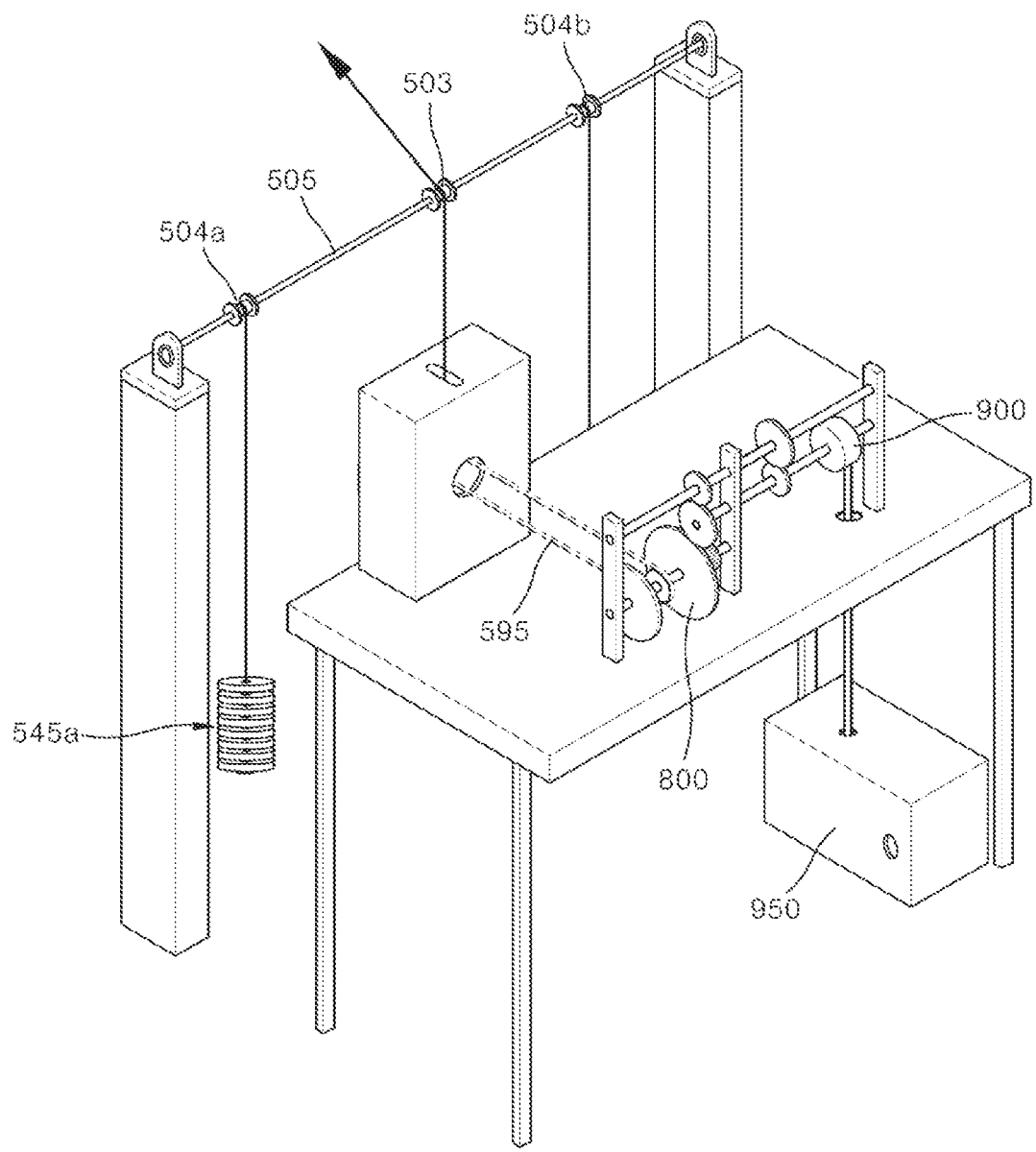
FIG. 12 illustrates a power transmission between a gearbox and speed-up device in accordance with one embodiment of the present disclosure.

The gearbox 500 may be configured to allow the forward operation when the wave force is applied to the pendulum. For the forward operation of the gearbox 500 as shown in FIG. 12 and FIG. 13, a power transmission may be as follows: the pendulum movement force→the physical power converter→first rotation shaft 505→second rotation shaft 510→first drive shaft 520→first power transmitter 570→forward one-way clutches 550→second drive shaft 530→chain gear 590→speed-up device 800→electric power generator 900; at the same time, the rotation force of the first drive shaft 520 is delivered to left and right-positioned first and second weights 545A,545B to lift up the first and second weights 545A,545B.

In this connection, the forward one-way clutch 550 embedded in the fourth power transmission gear 570d may transmit the rotation force from the first drive shaft 520 via the first power transmitter 570 to the second drive shaft 530 such that the forward rotation force is allowed to be applied to the second drive shaft 530 but the reverse rotation force is disallowed to be applied to the second drive shaft 530.

That is, the first and second weights 545A and 545B may ascend via the forward rotation force of the first rotation shaft 505 due to the application of the wave force to the pendulum. At the absence of the application of the wave force to the pendulum, the first and second weights 545A and 545B may descend to apply the reverse rotation force to the first rotation shaft 505.

Figure 14:
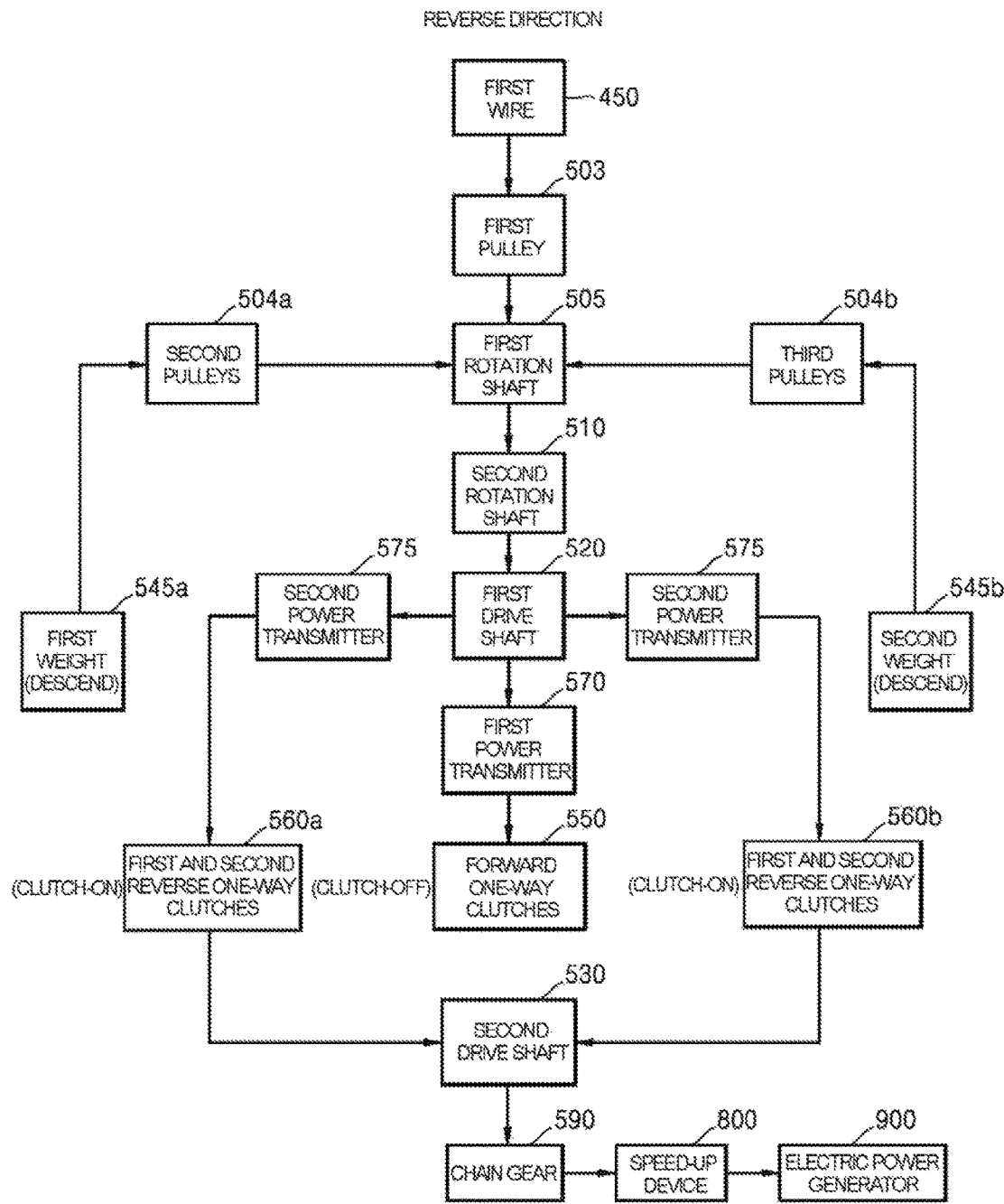
FIG. 14 is a flow chart of a power transmission for a reverse operation of a gearbox in accordance with one embodiment of the present disclosure.

At the absence of the application of the wave force to the pendulum, the reverse operation of the gearbox 500 may occur. For the reverse operation of the gearbox 500 as shown in FIG. 14, a power transmission may be as follows: first and second weights 545A and 545B→first drive shaft 520→second power transmitter 575→second drive shaft 530→first and second reverse one-way clutches 560a,560b→chain gear 590→speed-up device 800→electric power generator 900.

In this connection, the forward one-way clutch 550 embedded in the fourth power transmission gear 570d may act to block the reverse rotation force from the first power transmitter 570.

In this way, although, due to a long application period of the wave force, the rotation force is not applied to the first pulley 503, the descending operation of the first and second weights 545A and 545B may allow a continuous physical power to be applied to the speed-up device 800 without discontinuity.

The present gearbox may be configured to allow the rotation force of the first drive shaft 520 to ascend the first and second weights 545A and 545B during the forward operation. At the absence of the application of the wave force to the pendulum, during the reverse operation of the gearbox 500, the present gearbox may be configured to allow the first and second weights 545A and 545B to descend to generate a physical potential energy which may be outputted via the chain gear 590 to the speed-up device 800 and to the electric power generator 900.

The output of the gearbox may be delivered via the chain gear 590 and then a chain member 595 as power transmission means to the speed-up device 800, which, in turn, may deliver the rotation force thereof to the electric power generator 900.

A reference numeral "950" refers to a battery to charge an electrical energy generated from the electric power generator 900.

Figure 15A:
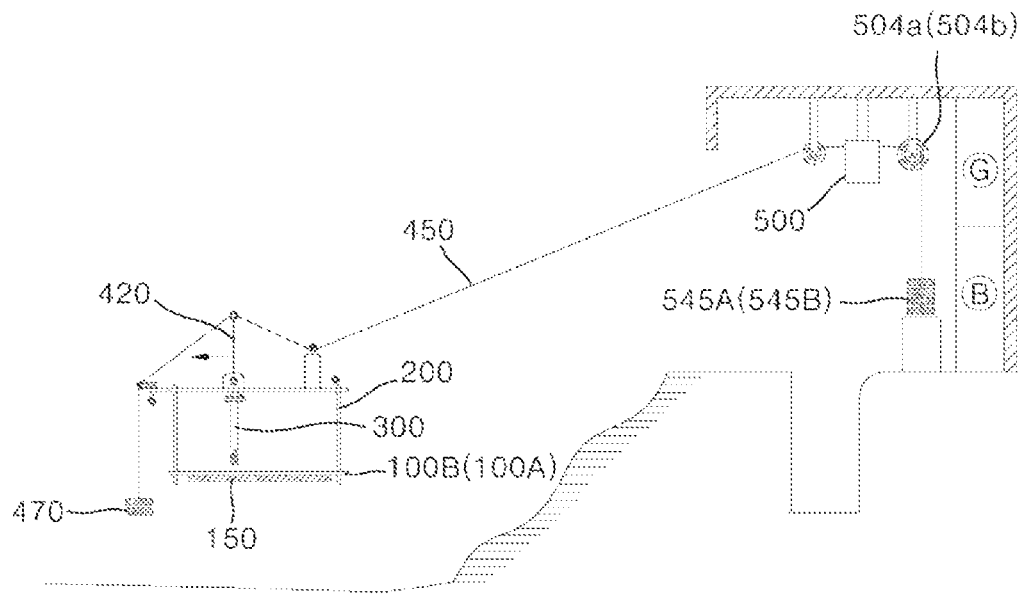
FIGS. 15A, 15B, and 15C illustrate a state or operation of the present system before and after application of a wave force to the pendulum, and a returning operation of the pendulum respectively.
Figure 15B:
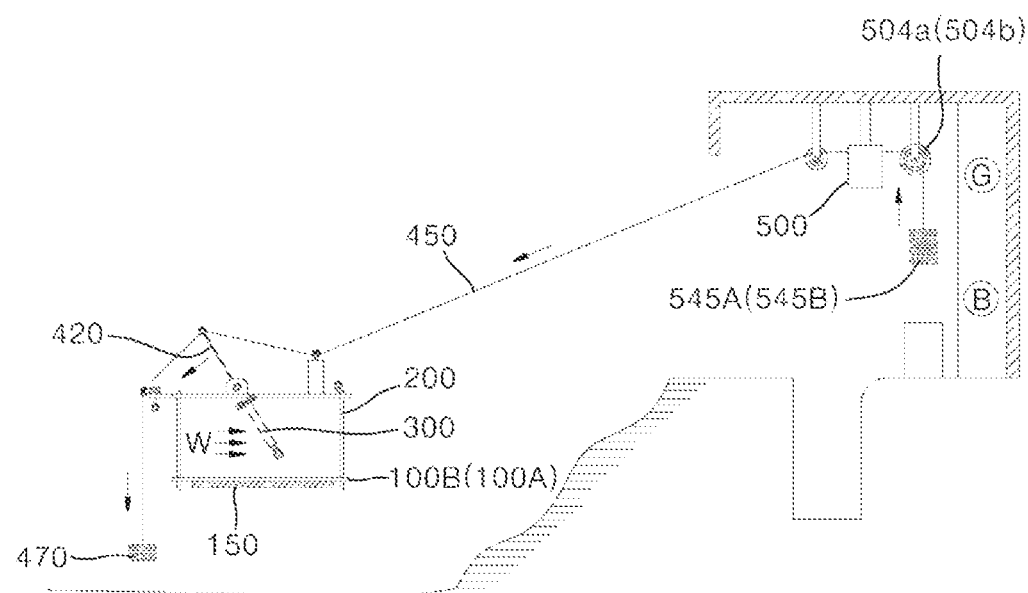
Figure 15C:
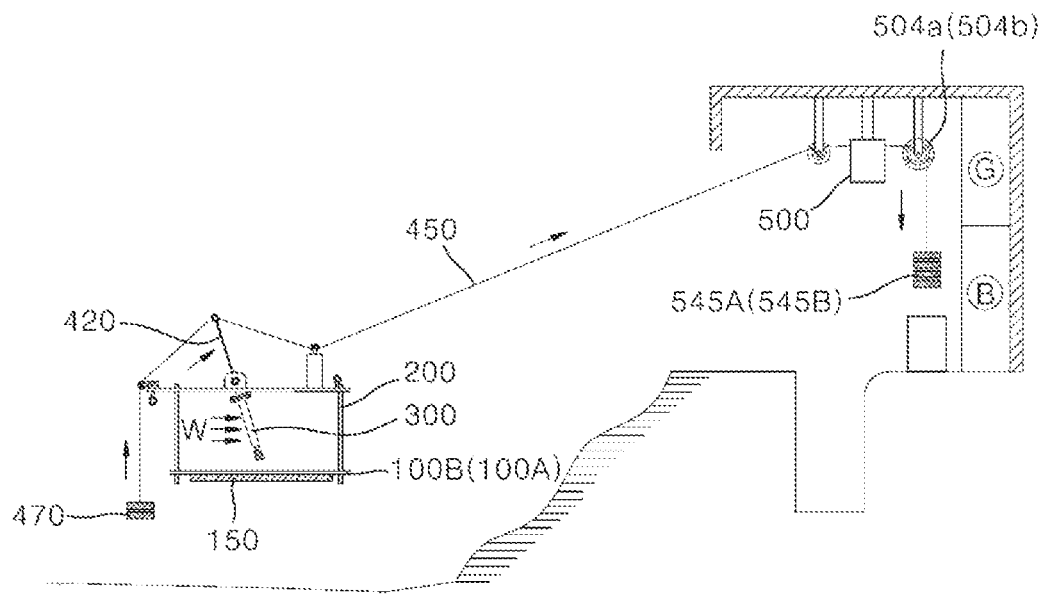

FIGS. 15A, 15B, and 15C illustrate a state or operation of the present system before and after application of a wave force to the pendulum 300, and a returning operation of the pendulum 300 respectively.

FIG. 15A illustrates a state of the present system before application of a wave force to the pendulum 300. At this state, the pendulum 300, first connection bars 410 and second connection bars 420 are oriented perpendicularly to the sea-water face.

FIG. 15A illustrates an operation of the present system after application of a wave force to the pendulum 300. For this operation, the pendulum 300, first connection bars 410 and second connection bars 420 may swing in a counter-clockwise direction around the third connection bars 430. In this connection, the returning weight 470 may descend, and the first wire 450 may be pulled toward the returning weight 470 to apply the forward rotation force to the first pulley 503 and then to ascend the first and second weights 545A and 545B.

FIG. 15C illustrates a returning operation of the pendulum 300. For this operation, the first and second weights 545A and 545B may descend and thus the tension force of the first wire 450 may allow the pendulum 300, first connection bars 410 and second connection bars 420 to swing in a clockwise direction around the third connection bars 430. In this way, the returning weight 470 may ascend to its original position.

Figure 16:
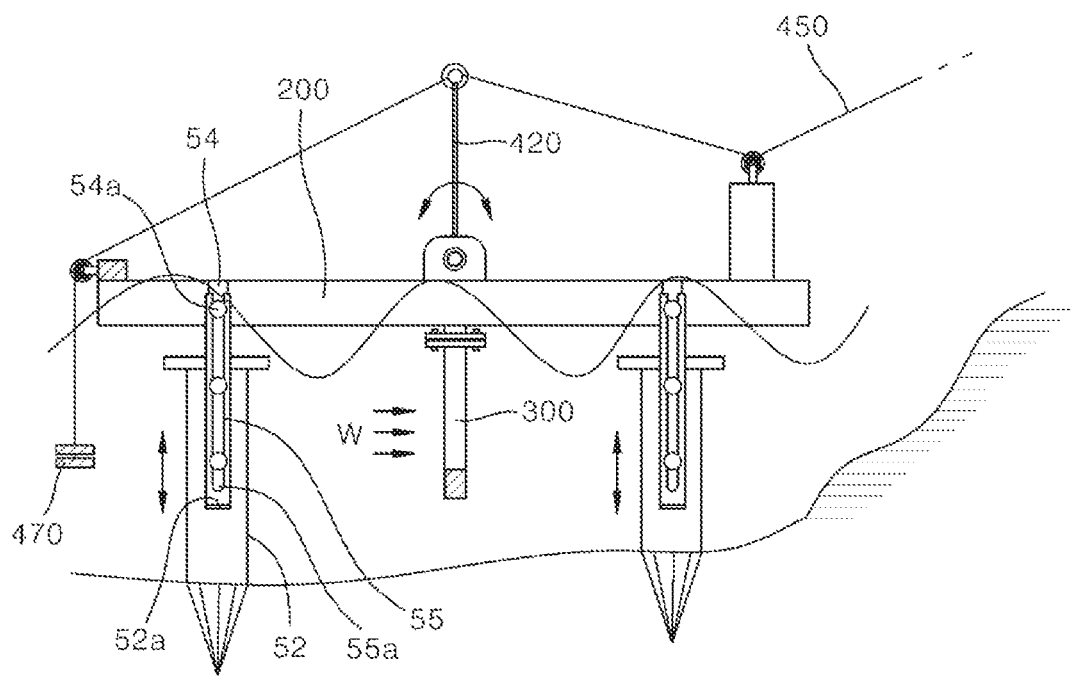
FIG. 16 and FIG. 17 illustrate another example of holding means in accordance with the present disclosure.
Figure 17:
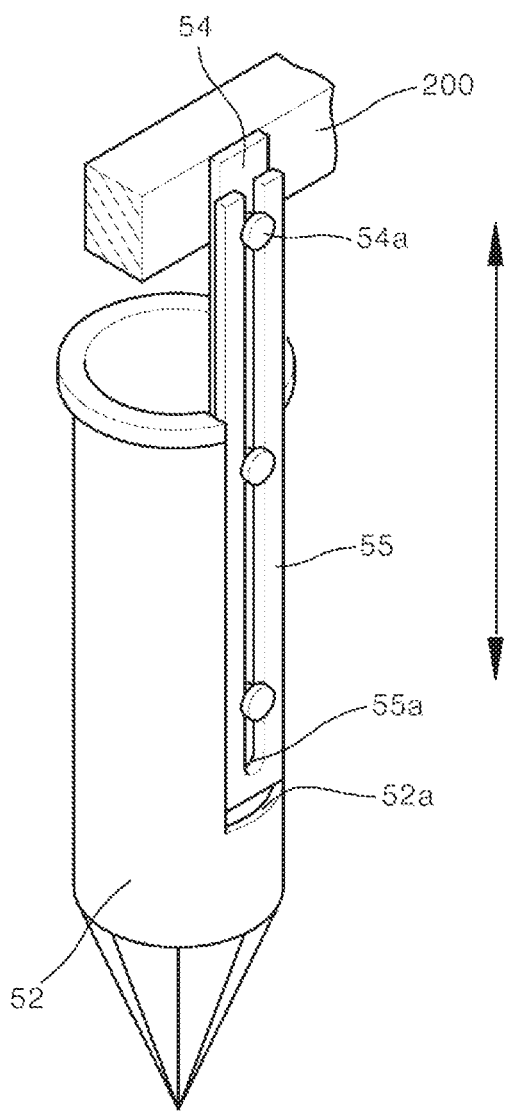

FIG. 16 and FIG. 17 illustrate another example of holding means in accordance with the present disclosure. The holding means may include an anchor pile 52 to be partially inserted into a sea floor, wherein the anchor pile 52 is hollow in a longitudinal direction thereof, and has a receiving slot partially formed in a longitudinal direction thereof; an elongate guide piece 55 inserted into the receiving slot of the anchor pile 52, wherein the guide piece 55 has a guide slot 55a formed in a longitudinal direction thereof and open at a top thereof; an elongate fixing plate 54 fixed to each of the floating members 100A and 100B; and a plurality of guide protrusions 54a horizontally extending from the fixing plate 54 and vertically spacedly arranged with one another, wherein a plurality of guide protrusions 54a is slidably inserted into the guide slot 55a, wherein the plurality of guide protrusions 54a is slidably vertically moved down such that the fixing plate 54 is inserted into the inner hollow space of the anchor pile 52.

The anchor pile 52 may have the receiving slot 52a partially formed in a longitudinal direction thereof and open at a top end thereof. The anchor pile 52 may be open at the top thereof. The elongate guide piece 55 may be inserted into the receiving slot 52a and may be fixed to the plate, for example, using a welding. In this connection, an upper portion of the guide slot 55a may be above the top of the anchor pile 52.

Thus, the holding means in this example may dispense with the anchoring structure 650, holding weight 640, and first and second holding wires which are the component of the holding means as described with reference to the previous example. The holding means in this example may employ not the wire but the anchor pile 52 fixed to the sea floor.

The present wave power generation system may be capable of generating a continuous physical rotation force in a single direction regardless of rising and ebb tides, and of using higher level wave energy at a location more distant from a land using the first wire 450 which transmits the pendulum movement force to the gearbox 500 on a land.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

REFERENCE NUMERALS

52: ANCHOR PILE 52A: RECEIVING SLOT
54: ELONGATE FIXING PLATE 54A: GUIDE PROTRUSIONS
55: ELONGATE GUIDE PIECE 55A: GUIDE SLOT
60: STOPPER MEANS 62A: WHEEL PULLEY
65: STOPPER BAR 100A,100B: FLOATING MEMBERS
115: COUPLING HOLE 125: COUPLING HOLE
145: CONNECTOR ROD 150: WEIGHT
200: FLOATING MEMBERS 202: TRANSVERSE PIPES
204: LONGITUDINAL PIPES 205: VERTICAL PIPES
300: PENDULUM 305: GROOVE
315: THROUGH-HOLE 350: BALANCER WEIGHT
410: FIRST CONNECTION BARS 420: SECOND CONNECTION BARS
425: CONNECTION BRIDGE 430: THIRD CONNECTION BARS
435: UNIVERSAL JOINTS 440: SUPPORT BRACKET
450: FIRST WIRE 450A: SECOND WIRE
470: RETURNING EIGHT 500: GEARBOX
502: FIRST POWER GEAR 503: FIRST PULLEY
504A,504B: SECOND, THIRD PULLEYS 505: FIRST ROTATION SHAFT
506: SECOND POWER GEAR 509: POWER CONVEYOR
510: SECOND ROTATION SHAFT 520: FIRST DRIVE SHAFT
522, 524, 525: FIRST, SECOND, AND THIRD SUPPORT SHAFTS
530: SECOND DRIVE SHAFT
550: FORWARD ONE-WAY CLUTCHES
560A,560B: FIRST AND SECOND REVERSE ONE-WAY CLUTCHES
570: FIRST POWER TRANSMITTER
570A, 570B, 570C, 570D: FIRST, SECOND, THIRD, AND FOURTH POWER TRANSMISSION GEAR
575: SECOND POWER TRANSMITTER
575A, 575B, 575C: FIRST AND SECOND, THIRD ROTATION GEARS
580: FLY WHEEL 590: CHAIN GEAR
595: CHAIN MEMBER 602: RING
610: FIRST HOLDING WIRE 620: HOLDING SUPPORT
621: HOLDING SUPPORT SHAFT 622: HOLDING WHEEL
624: HOLDING PULLEY 625: HOLDING STOPPING BAR
630: SECOND HOLDING WIRE 635: STRAP BUCKLE
640: HOLDING WEIGHT 650: ANCHORING STRUCTURE
660: ANCHORING PULLEY 662: ANCHORING WHEEL
665: ANCHORING STOPPER 700: ROTATABLE CONNECTOR
710: FIRST FLANGE 715: SLOTS
720: SECOND FLANGE 730: VERTICAL CONNECTORS
740: NUT 750: TORSION SPRING
800: SPEED-UP DEVICE
900: ELECTRIC POWER GENERATOR

What is claimed is:

1. A wave power generation system comprising:
   first and second floating members to generate a floating force, wherein the first and second floating members are spaced from each other;
   first and second frames respectively coupled to the first and second floating members;
   a pendulum swayably coupled to the first and second frames, wherein the pendulum is disposed between the first and second frames;
   holding means coupled to the first and second frames to hold the frames so as to allow movement of the floating members;
   first connection bars coupled to a top of the pendulum;
   a physical power converter operatively coupled to the first and second frames and operatively coupled to the first connection bars, wherein the physical power converter is configured to convert a pendulum movement force of the pendulum to a rotation force;
   a first wire operatively coupled to the physical power converter;
   a gearbox disposed on a land and operatively coupled to the wire, wherein the gearbox is configured to receive the rotation force from the first wire and to generate a continuous rotation force using first and second weights and one-way clutch; and
   power transmission means configured to transmit an output from the gearbox to an electric power generator.

2. The system of claim 1, wherein each frame includes a plurality of transverse pipes, a plurality of longitudinal pipes, and a plurality of vertical pipes, which are collectively coupled to one another.

3. The system of claim 1, wherein the physical power converter includes:
   second connection bars spaced from each other, the second connection bars being vertically coupled to the first connection bars respectively;
   a connection bridge to connect tops of the second connection bars to each other;
   third connection bars horizontally coupled to, at one end thereof, the second connection bars respectively, wherein the third connection bars are coupled, at the other end thereof, to the first and second frames respectively; and
   universal joints provided at a middle portion of the third connection bars respectively,
   wherein the first wire is coupled to the connection bridge to transmit the physical force from the pendulum to the gearbox.

4. The system of claim 3, further comprising a returning weight coupled to the connection bridge via a second wire to apply a returning force to the connection bridge.

5. The system of claim 2, wherein the physical power converter further includes rotatable connectors, each rotatable connector connecting each second connection bar and each first connection bar to each other, wherein each rotatable connector allows each first connection bar to rotate with respect to each second connection bar.

6. The system of claim 5, wherein the rotatable connector includes:
   a first flange coupled to each second connection bar;
   a second flange coupled to each first connection bar;

a plurality of slots defined in the first flange, the slots being arranged in an outer periphery of the first flange and spaced from each other, each slot extending in an arc shape; and vertical connectors corresponding to the slots respectively, each vertical connector extending from the second flange upwards and through each slot and beyond each slot, wherein each vertical connector is movably fastened to the first flange using a nut.

7. The system of claim 5, wherein the rotatable connector includes:
a first flange coupled to each second connection bar;
a second flange coupled to each first connection bar;
a torsion spring disposed between the first and second flanges and coupled thereto, wherein the torsion spring allows the rotated first connection bar to return to its original position.

8. The system of claim 1, wherein the gearbox includes:
a first pulley wound by the first wire;
a first rotation shaft rotated via movement of the first wire and axially coupled to a first power gear;
second and third pulleys axially coupled to the first rotation shaft at both ends thereof respectively;
first and second weights suspended by second wires respectively winding the second and third pulleys respectively, wherein a forward rotation of the first rotation shaft allows the first and second weights to ascend, and a reverse rotation of the first rotation shaft allows the first and second weights to descend, thereby to provide the first rotation shaft with a rotation force;
a second rotation shaft axially coupled to a second power gear meshed with the first power gear axially coupled to the first rotation shaft, wherein the second power gear rotates together with the first power gear;
a first drive shaft coupled via a power conveyor to the second rotation shaft to rotate together with the second rotation shaft;
a second drive shaft to receive a rotation force from the first drive shaft to rotate together with the first drive shaft;
a chain gear as the power conveyor to transmit the rotation force from the first drive shaft to the second drive shaft;
first and second power transmitters disposed between the first and second drive shafts, wherein each of the first and second power transmitters includes a plurality of gears meshed with each other to transmit a physical power from the first drive shaft to the second drive shaft;
a forward one-way clutch embedded in a gear of the first power transmitter axially coupled to the second drive shaft to deliver a forward rotation force to the second drive shaft; and
first and second reverse one-way clutches axially coupled to the second drive shaft for delivery of a reverse rotation force.

9. The system of claim 8, wherein the first power transmitter includes first, second, third, and fourth power transmission gears configured to transmit a forward rotation force of the first drive shaft to the second drive shaft as a forward rotation force applied thereto; and
wherein the second power transmitter includes first, second, and third rotation gears configured to transmit a reverse rotation force of the first drive shaft to the second drive shaft as a forward rotation force applied thereto.

10. The system of claim 8, wherein the gearbox further includes stopper means configured to stop a rotation of the first rotation shaft.

11. The system of claim 10, wherein the stopper means includes a wheel pulley axially coupled to the first rotation shaft at each of both ends thereof, wherein the wheel pulley has a plurality of holes defined therein; and a stopper bar axially movably coupled to each vertical support to be inserted into a selected hole of the wheel pulley.

12. The system of claim 1, wherein the holding means includes:
a first holding wire coupled, at one end thereof, to a ring fixed to one of the first and second frames;
a holding weight coupled to the other end of the first holding wire;
a holding support disposed on a land to support the first holding wire; a second holding wire coupled, at one end thereof, to an anchoring pulley fixed to the other of the first and second frames and coupled, at the other end thereof, to an anchoring structure.

13. The system of claim 12, wherein the holding means further includes a strap buckle provided at a middle portion of the second holding wire.

14. The system of claim 1, wherein the holding means includes:
an anchor pile to be partially inserted into a sea floor, wherein the anchor pile is hollow in a longitudinal direction thereof, and has a receiving slot partially formed in a longitudinal direction thereof;
an elongate guide piece inserted into the receiving slot of the anchor pile, wherein the guide piece has a guide slot formed in a longitudinal direction thereof and open at a top thereof;
an elongate fixing plate fixed to each of the floating members; and
a plurality of guide protrusions horizontally extending from the fixing plate and vertically spacedly arranged with one another, wherein a plurality of guide protrusions is slidably inserted into the guide slot, wherein the plurality of guide protrusions is slidably vertically moved down such that the fixing plate is inserted into the inner hollow space of the anchor pile.

15. The system of claim 1, wherein the pendulum has a groove defined in a front face in a middle region thereof.

16. The system of claim 1, wherein the pendulum include a lower pendulum, and an upper pendulum coupled via a rotatable connector to the lower pendulum.

17. The system of claim 3, wherein the third connection bars are rotatably coupled to the first and second frame via brackets respectively coupled to both frames.

18. The system of claim 12, wherein the holding means further includes an anchoring wheel coupled to the anchoring pulley and having a plurality of holes defined therein; and an anchoring stopper to be inserted into the selected hole of the anchoring wheel to stop the anchoring structure.

19. The system of claim 12, wherein the holding support includes:
a holding pulley disposed on a land to support the first holding wire;
a holding support shaft to support the holding pulley;
a holding wheel coupled to the holding support shaft, wherein the holding wheel has a plurality of holes; and
a holding stopper to be inserted into a selected hole of the holding wheel to stop a rotation of the holding support shaft.

20. The system of claim 12, wherein the pendulum has a sea-water through-hole to deal with an excessive wave pressure.

\* \* \* \* \*